United States Patent [19]

Österman

[11] Patent Number: 4,662,802
[45] Date of Patent: May 5, 1987

[54] DEVICE FOR EFFECTING A SEAL AGAINST AN UNDERLYING SURFACE

[76] Inventor: Bror E. Österman, Styrmansgatan 52, S-114 60 Stockholm, Sweden

[21] Appl. No.: 734,197

[22] Filed: May 15, 1985

[30] Foreign Application Priority Data

May 17, 1984 [SE] Sweden ............................... 8402665

[51] Int. Cl.$^4$ .............................................. B23B 47/34
[52] U.S. Cl. ........................................ 408/67; 51/273; 144/252 R; 408/56
[58] Field of Search ............... 144/252 R; 408/56, 57, 408/58, 59, 61, 67; 409/137; 83/98, 100, 169; 51/273

[56] References Cited

U.S. PATENT DOCUMENTS

| | | | |
|---|---|---|---|
| 665,158 | 1/1901 | Abrams | 144/252 R |
| 2,246,916 | 6/1941 | Fischer | 144/252 R |
| 2,359,931 | 10/1944 | Moffitt | 408/67 |
| 2,870,993 | 1/1959 | Jahnke | 408/59 |
| 3,033,298 | 5/1962 | Johnson | 408/59 |
| 3,167,260 | 1/1965 | Gibbons et al. | 144/252 R |

FOREIGN PATENT DOCUMENTS 2539120 3/1976 Fed. Rep. of Germany ........ 408/56
3049268 7/1982 Fed. Rep. of Germany .

*Primary Examiner*—Eugene F. Desmond
*Assistant Examiner*—Daniel W. Howell
*Attorney, Agent, or Firm*—Burns, Doane, Swecker & Mathis

[57] ABSTRACT

A device for effecting a seal against an underlying surface (5) in conjunction with drilling a hole therein, comprising an inverted cup-shaped member (9,11) whose rim (23) is intended to sealingly abut the underlying surface around the site of the hole (3) to be drilled, and the bottom (11) of which remote from the underlying surface is provided with a hole (27) through which a drill (1) is able to pass in at least substantially sealing fashion in conjunction with a drilling operation. The inverted cup-shaped member includes a tubular, annular element (9), which constitutes a cup-wall element, and a plate-like cover member (11) which forms the bottom. The cover member (11) is removable and therewith exchangeable, and can be mounted on the annular element in an at least substantially sealing fashion in a number of mutually different rotational positions, and is provided with an excentric hole (27) for the drill (1). The annular element (9) is provided with a laterally extending arm element (13) which presents at its distal end a support (33) intended for co-action with the underlying surface (5). A suction attachment means (15) is arranged on the arm element (13) between the annular element and the support intended for co-action with the underlying surface, so as to enable the device to be fastened to the underlying surface with the annular element and the aforesaid support in abutment therewith. A fluid-supply connection (13,39) and/or a suction connection (51) is arranged to supply a fluid to the interior (29) of the annular element or to remove fluid and drill cuttings by suction from the interior of the annular element.

9 Claims, 3 Drawing Figures

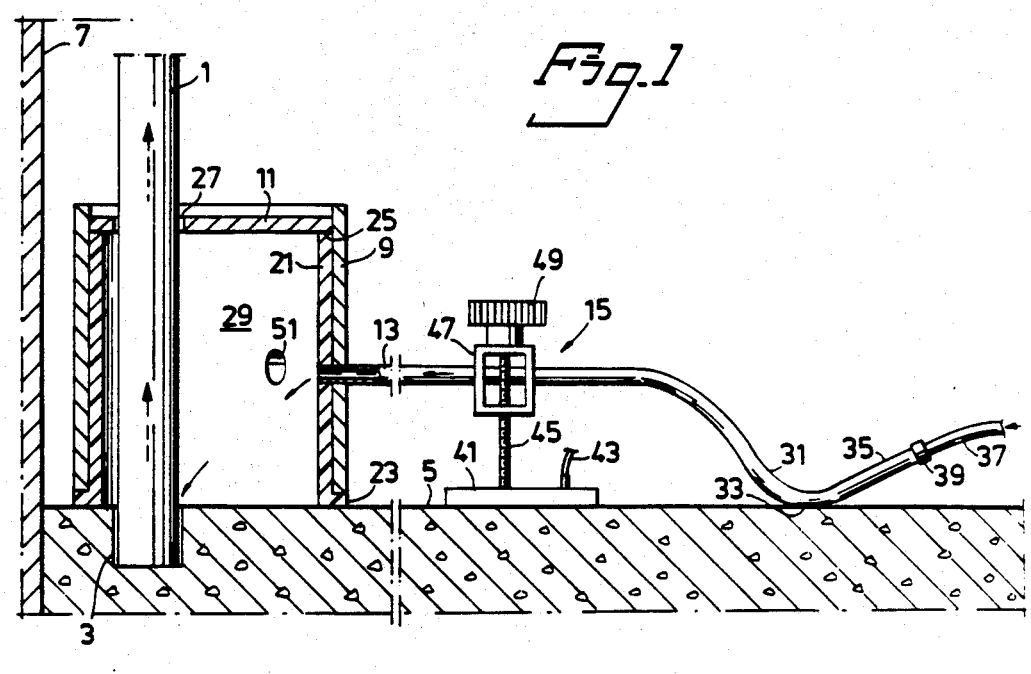
Fig. 1
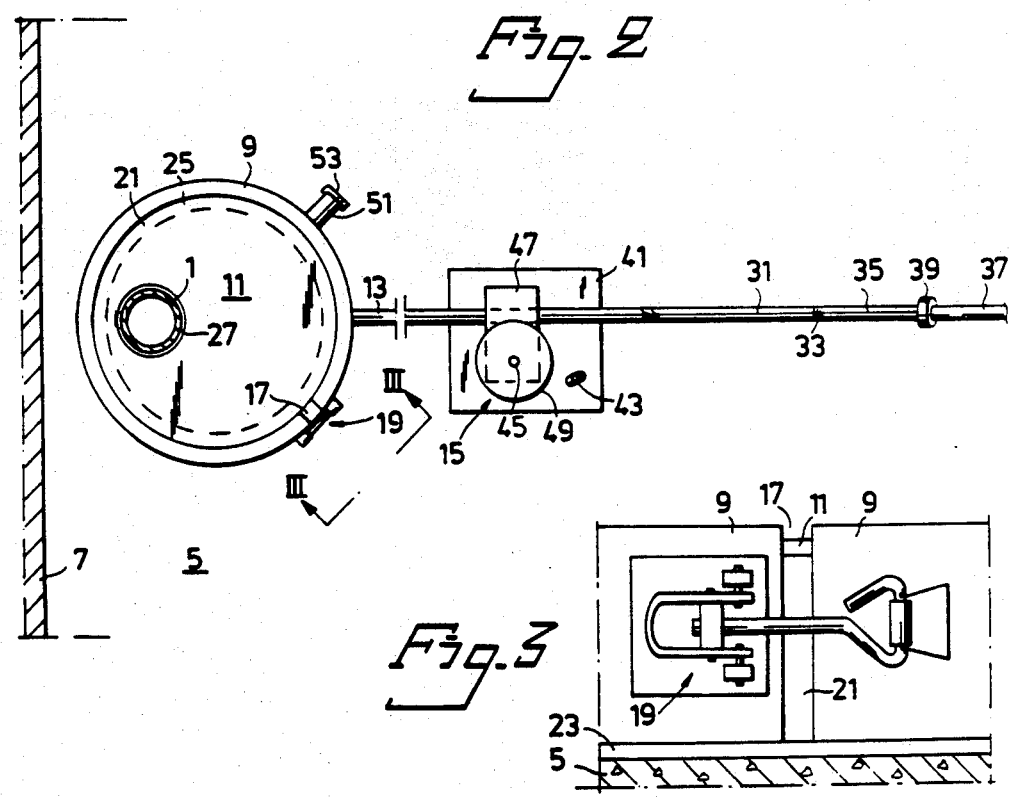
Fig. 2
Fig. 3

DEVICE FOR EFFECTING A SEAL AGAINST AN UNDERLYING SURFACE

TECHNICAL FIELD

The present invention relates to a device for effecting a seal against a substantially planar underlying surface, such as a wall, a ceiling, a floor or like structure in conjunction with drilling a hole therein, said device comprising an inverted bowl-shaped or cup-shaped member whose rim is intended to abut sealingly against the underlying surface, around the site of the hole to be drilled, and the base of which member remote from the underlying surface is provided with a hole through which a drill is intended to pass in an at least substantially sealed fashion in conjunction with a drilling operation.

TECHNICAL BACKGROUND

When drilling into a surface of the aforesaid kind, i.e. normally indoors, two troublesome problems occur. When a dry-drilling operation is used, the drill dust and cuttings pervade the surroundings, to penetrate and settle on almost all conceivable locations. When a coolant or flushing liquid, normally water, is used in conjunction with a drilling operation, this coolant or flushing liquid in most cases being introduced through the drill, serious difficulties are encountered in preventing an undesirable and uncontrollable flow of liquid from the drilled hole, especially in the case of a hole drilled in a vertical wall or a ceiling. Various "open" arrangements comprising a suction conduit applied to remove the outflowing liquid by suction normally provide a clearly unsatisfactory result.

It has been suggested that one should use "back suction", i.e. that there is used a hollow drill and that drill cuttings and/or liquid (it is assumed that the latter is supplied in a controlled manner externally of the drill) is, or are, removed by suction through the hollow drill, with the aid of dry or wet suction means connected through a swivel coupling. A controlled supply of liquid is very difficult to achieve even in this case, however, when the hole is drilled laterally into a vertical wall or upwardly into a ceiling, for example.

One method of attempting to master this problem is to place around the drill an elastic annular element which seals against both the drill and the surface being drilled and which is displaced progressively along the drill as said drill penetrates into the surface. The liquid is fed through a separate channel into the wedge-shaped sealed space defined by the elastic annular element, at precisely that place where the drill enters the aforesaid surface. It would be possible also to use such an elastic annular element in the absence of back suction, i.e. it would be possible to supply the flushing liquid through the interior of the drill and to remove the liquid by suction through said wedge-shaped space and said channel. An example of such an annular seal is found in DE No. A1 30 49 268.

Sealing rings of the aforesaid kind, however, have been found relatively unsuitable in use; difficulties can be experienced in obtaining a satisfactory seal; the displacement of the sealing ring on the drill can lead to problems; different drill sizes require different sizes of sealing ring etc.; durability and ease of handling are not so good.

For the purpose of collecting primarily drill cuttings when dry-drilling, it is also known to use a cup-shaped device which is pressed sealingly against the underlying surface as drilling takes place, the drill passing through a suitably adapted hole in the cup bottom, through the cup space and into said surface, e.g. a wall. The device is held by hand and is hence encumbered with obvious functional limitations and drawbacks. Devices of this kind seem to have limited use, and then primarily with drills of relatively small diameter.

OBJECT OF THE INVENTION

The object of the present invention is to provide a device of the aforesaid kind in which the aforementioned limitations and drawbacks have been eliminated to a great extent and a number of advantages gained, such as:

the device can be used both when dry-drilling and when drilling together with a flushing liquid;

it can be used with conventional suction facilities and with back-suction;

it can be readily attached to the underlying surface in an easily adjustable fashion;

it can be readily adapted to different drill sizes and types of drill and enables holes to be drilled in the vicinity of angles, corners etc.;

it is structurally simple while being, at the same time, both stable and robust so that it is well able to stand-up to the hard environmental conditions of construction workplaces.

SUMMARY OF THE INVENTION

The aforesaid object is achieved with a device having the characteristic features set forth in the accompanying claims.

Thus, the device according to the invention is mainly characterized in that it comprises an inverted cup-shaped member which includes a tubular, preferably cylindrical annular element which forms the cup wall, and a cover member which is connected to said annular element and which forms the cup bottom. The cover member suitably has the form of a lid and is preferably in the form of a plate and circular in particular. The cover plate can be easily removed and is therefore readily exchangeable. It connects with the annular element in an at least substantially sealing manner, suitably at the bottom edge of the annular element. The cover plate has provided therein a hole adapted for passage of a drill therethrough. The hole is conveniently located eccentrically, suitably close to one edge of the cover plate, i.e. close to the connection to the annular element. The cover plate can also be positioned on the annular element in various positions of rotation, preferably achieved smoothly and continuously, thereby to enable the hole through which the drill passes to be located at practically any desired position within the cross-section of the annular element. Because it is possible to use mutually different cover plates, the device can be readily adapted to suit mutually different drills, by choosing a suitable cover plate. Cover plates in which the holes are placed in mutually different positions can also be used. It will be appreciated that these additional cover plates represent a cheap accessory, enabling one and the same device to be used in conjunction with drills which vary considerably in dimensions and design.

The annular element is provided with a laterally and outwardly projecting arm element, which has located at the outer free end thereof a support point for co-action with the underlying surface. Located between this support point and the annular element, which means a second support point on the underlying surface, is a fastener means, preferably in the form of a suction attachment means arranged on the arm element. The suction attachment means is suitably arranged so that it can be moved along the arm element and be freely movable relative thereto, and is intended to be sucked firmly against the underlying surface with the aid of a separately provided vacuum source, and to tighten down the arm element, so that the annular element (subsequent to being brought to a suitable position on the underlying surface) and the support point at the free end of the arm element are forced firmly against said underlying surface. The device is in this way anchored firmly to the underlying surface prior to effecting a drilling operation.

The device is also provided with a fluid-supply connection and/or a closeable suction connection for supplying a fluid (particularly a liquid, such as water) to the interior of the annular element or for withdrawing the fluid and/or drilling dust and cuttings from the interior of the annular element.

When the device is used for supplying fluid in conjunction with back suction, the suction connection, if provided, is inactive and closed. It has been found that in this case the back suction is effective to prevent any liquid whatsoever from flowing out through the device (not even around the drill), even when drilling upwardly into a ceiling for example. The annular element is held effectively pressed against the underlying surface and a good and reliable sealing effect is obtained between the element and said underlying surface, due to the two supporting points against the surface. Because of the back suction, minor leakage points in the device, particularly around the drill, will lack significance, since air is drawn in at these points.

According to one advantageous embodiment of the device according to the invention, fluid is supplied via the arm element, which in this case is tubular and suitably has the form of a pipe along which the suction attachment means can be readily moved. The one end of the arm element or pipe can be suitably provided with a hose coupling or the like. In this case the requisite support point at said free end may simply comprise a bend or curve in the arm element or pipe, the utmost end of which will therefore face away from the underlying surface, therewith to facilitate the connection of a fluid supply line.

When the device is used together with "normal" suction, a suction line is connected to a suction connection located primarily on the annular element or secondarily on the cover plate. It has herewith been found that a finer fluid connection of the hollow-arm type need not be sealed-off separately, since there will be no leakage therethrough, but that ambient air will be drawn-in instead. This greatly facilitates the handling of the device, which exhibits dual functions.

Further features of the device according to the invention will be made apparent in the following description of a non-limiting exemplary embodiment, given with reference to the accompanying drawings.

BRIEF DESCRIPTION OF THE DRAWINGS

FIG. 1 is a schematic combined sectional and side view of an embodiment of a device according to the invention firmly affixed to an underlying surface or substratum, with a hollow drill in a working position.

FIG. 2 is a schematic view of the device according to FIG. 1 from above.

Finally, FIG. 3 is a schematic partial side-view taken in accordance with the arrows III—III in FIG. 1.

DESCRIPTION OF AN EXEMPLARY EMBODIMENT

In FIGS. 1-3 there is illustrated a device according to the invention used when water is supplied externally of a hollow drill 1 which operates with back suction and with which a hole 3 is being drilled in a concrete floor 5 at a location adjacent an adjoining wall 7.

The major parts of the device according to the invention comprise a cylindrical, tubular annular element 9, suitably made of stainless steel, a circular cover plate 11 for the free end of the annular element 9, a hollow arm 13 extending laterally from the annular element, and a suction attachment means 15 arranged on the hollow arm.

The annular element 9 is parted by a slot 17 (FIG. 3) which enables the annular element to be adjusted to different internal diameters, within certain limits. The annular element is held together with the aid of a tensioning and lock-hook arrangement 19, which bridges the slot 17 and which is of conventional design and will not therefore be described in detail. The arrangement 19 will be referred to hereinafter simply as the "lock hook", for reasons of expediency.

Fitted to the inner surface of the annular element is a sealing sleeve 21. In principle the sleeve is whole and elastic, and bridges the slot 17 to seal the same. The seal is folded outwardly, or provided with a flange 23, at the bottom end thereof, i.e. at the edge of the annular element 9 intended to lie sealingly against the underlying surface, this outward fold, or flange, covering said edge and forming a seal between said edge and the floor 5. The upper end of the sleeve 21 terminates somewhat short of the upper edge of the annular element 9, so that the sleeve forms a circumferential shoulder 25 on which the cover plate 11 can rest, in the form of a lid.

The diameter of the cover plate 11 corresponds to the inner diameter of the annular element 9. It will be understood that the cover plate can be readily placed on the shoulder 25 in any selected position of rotation, when the lock hook 19 is released and the annular element 9 has "sprung out" to its relaxed, normal state. When the lock hook is then applied, the cover plate 11 is drawn tightly against the inside of the annular element 9, whose diameter has decreased somewhat, and the shoulder 25 in a fully sealing fashion.

Located in the cover plate 11 is a circular hole 27 for the hollow drill 1. The diameter of the hole is chosen to this end, and the hole is placed adjacent the periphery of the cover plate. This enables the drill to be brought to work close to the inner surface of the annular element 9, and thus also close to the wall 7, as shown in FIGS. 1 and 2. It will be seen that when changing to another drill of different diameter, the cover plate 11 can be simply exchanged for one in which the hole 27 is adapted to the size of the new drill.

The hollow arm 13 is attached in the annular element 9 and communicates with the interior 29 thereof. The arm element 13 extends substantially parallel with and at a given distance from the floor 5, with the exception of the outer, free part of the arm element. This free end of the arm element presents a downwardly extending bend 31, which forms a support 33, this support lying approximately in the same plane as the sealing flange 23 on the abutment edge of the annular element 9. As a result of the bend 31, the distal end 35 of the arm element 13 slants upwardly, away from the floor 5, i.e. it is free and accessible, so that a water-supply conduit 37 can be readily connected to a connector 39 on said distal end 35.

The suction attachment means 15 comprises a conventional suction plate 41 which is intended to be held firmly to the floor 5 through a vacuum effect, this vacuum being applied via a conduit 43 which is connected in turn to a conventional source of vacuum not shown. Mounted in the suction plate 41 is an upstanding screw 45. The screw passes freely in a vertical direction through one perforated end of a square, tubular member 47. A tightening knob or wheel 49 is screwed onto the free end of the screw 45. The arm element 13 passes freely in a horizontal direction through the other, perforated end of the coupling member 47. It will be seen that the suction attachment means can thus be placed in any selected position along the arm element 13 and in any selected rotated position relative thereto, thereby to enable the suction plate always to be placed in the best position against the floor or some other underlying surface involved.

When mounting the illustrated device on the floor 5, the device is held in an approximate position on the floor and the suction plate 41 fastened thereto, by applying a vacuum. The tightening knob 49 has not yet been screwed down. The annular element 9 with the arm element 13 can now be displaced and swung precisely to the position desired, whereafter the knob 49 is screwed down, so as to force the annular element 9 into sealing and locked abutment with the floor 5.

Although in the specific example, the device has been fastened to a floor structure, it will be understood that the device can be fastened just as readily to, for example, a ceiling, in that initially the device can be readily "suspended" with the aid of the suction plate, without requiring the device to be placed in precisely the correct position. Subsequent to this suspension of the device, the annular element 9 together with its perforated cover plate can be readily located exactly in the desired position, by simple displacement relative to the suction attachment means 15 and/or rotation about the screw 45.

As beforementioned, the device as exemplified is used to supply water in conjunction with back suction in the hollow drill, as indicated by arrows in FIG. 1. The device, however, can be used equally as well for conventional removal by suction of drill dust (dry drilling) or of liquid supplied through the interior of the hollow drill. To this end, the annular element 9 is provided with a suction connector 51 to which a suitable conventional source of vacuum, such as a socalled wet suction device, can be connected. In this case, the water-supply conduit 37 can be disconnected. The coupling 39, however, need not be sealed or closed-off. The suction connector 51, on the other hand, must be provided with a sealing cover 53 or corresponding means, when the device is used to supply water in the aforesaid manner.

Finally, it is emphasized that the device has been found to function in a highly satisfactory manner in all conceivable positions, i.e. even when drilling upwardly into a ceiling for example, where the device takes a position which is completely the reverse of that illustrated in FIG. 1, and where the problems caused by outwardly flowing water, for instance, are the most troublesome and in many cases render the use of water when drilling totally impossible.

As will be understood, the invention is not restricted to the embodiment particularly described, but changes and modifications can be made within the scope of the following claims. For example, the suction plate incorporated in the attachment means can be replaced with a mechanical attachment, for example by anchoring the screw 45 directly to the underlying surface.

I claim:

1. A device for effecting a seal against an underlying surface having a site for drilling a hole therein, said device comprising an annular walled element having a rim adapted to sealingly engage the underlying surface around the site, a cover member removably mounted on the annular element in a substantially sealing fashion, said cover member spaced from said rim and adapted to be mounted in a number of mutually different positions of rotation, and being provided with a hole preferably eccentrically displaced toward a region of engagement of said cover member with said annular element, said hole being adapted to accommodate a drill, the annular element having extending laterally therefrom an arm element which provides at its outer end a support for coaction with said underlying surface, means for fastening said device to the underlying surface, said fastening means arranged on said arm element between said annular element and the support, said arm element sufficiently rigid such that the device can be fastened to the underlying surface by said fastening means with the annular element and said support engaged with the underlying surface and at least one of fluid-supply connection means for supplying a fluid to an interior of the annular element and suction connection means for withdrawing fluid and drill cuttings from the interior of said annular element with suction.

2. The device according to claim 1, wherein the annular element is slotted such as to enable the cross-sectional area of the annular element to be varied by varying the width of the slot, a tightening and locking means arranged to bridge said slot and to impart a given cross-sectional area to said annular element when in a tightening and locking position, the cover member being plate-like and arranged so that when the tightening and locking means occupies an open position, said cover member can be applied in mutually different rotational positions relative to the annular element and so that when the tightening and locking means occupies its tightening and locking position said cover member is held firmly in relation to the annular element.

3. The device according to claim 2, wherein the annular element is provided internally thereof with an abutment shoulder which receives the cover member.

4. The device according to claim 3, wherein the annular element is provided internally thereof with an impervious elastic lining which in the region of the rim of said annular element forms a seal against the underlying surface and at a location adjacent said cover member forms the abutment shoulder.

5. The device according to claim 1, 2, 3 or 4, wherein the arm element is tubular and forms said fluid-supply connection means.

6. The device according to claim 5, wherein the suction means connection is arranged in the annular element.

7. The device according to claim 5, wherein the suction connection means is arranged in the cover member.

8. The device according to claim 5, wherein said fastening means is arranged for displacement along the arm element and is adjustable relative thereto in respective positions of displacement.

9. The device according to claim 5, wherein said fastening means includes a suction attachment means.

* * * * *